United States Patent
Pandit et al.

(10) Patent No.: US 7,310,697 B2
(45) Date of Patent: Dec. 18, 2007

(54) SYSTEM AND METHOD FOR DYNAMIC USB POWER SOURCE

(75) Inventors: Amol Pandit, Greeley, CO (US);
Robert Bohl, Fort Collins, CO (US);
Dan Byrne, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 149 days.

(21) Appl. No.: 10/978,607

(22) Filed: Nov. 1, 2004

(65) Prior Publication Data
US 2006/0095641 A1    May 4, 2006

(51) Int. Cl.
G06F 13/20    (2006.01)
G06F 3/00    (2006.01)
G06F 15/16    (2006.01)
G06F 1/00    (2006.01)
H04B 1/38    (2006.01)

(52) U.S. Cl. .................. 710/313; 710/2; 710/310; 713/300; 709/209; 455/572

(58) Field of Classification Search ............. 710/313, 710/1, 2, 310; 713/300, 310; 709/209; 455/572
See application file for complete search history.

(56) References Cited

U.S. PATENT DOCUMENTS

| | | | | |
|---|---|---|---|---|
| 5,675,813 A * | 10/1997 | Holmdahl | ................ | 713/310 |
| 6,000,042 A * | 12/1999 | Henrie | ................ | 714/40 |
| 6,105,143 A | 8/2000 | Kim | | |
| 6,125,455 A | 9/2000 | Yeo | | |
| 6,253,329 B1 * | 6/2001 | Kang | ................ | 713/300 |
| 6,362,610 B1 | 3/2002 | Yang | | |
| 6,541,879 B1 | 4/2003 | Wright | | |
| 6,665,801 B1 * | 12/2003 | Weiss | ................ | 713/300 |
| 6,782,491 B1 * | 8/2004 | Foedlmeier et al. | ................ | 714/37 |
| 6,928,562 B2 * | 8/2005 | Cohen et al. | ................ | 713/320 |
| 6,963,933 B2 * | 11/2005 | Saito et al. | ................ | 710/1 |
| 7,002,814 B2 * | 2/2006 | Kim et al. | ................ | 363/21.15 |
| 7,024,569 B1 * | 4/2006 | Wright et al. | ................ | 713/300 |
| 2002/0011516 A1 * | 1/2002 | Lee | ................ | 235/380 |
| 2003/0052547 A1 * | 3/2003 | Fischer et al. | ................ | 307/154 |
| 2004/0042138 A1 * | 3/2004 | Saito | ................ | 361/90 |
| 2004/0103223 A1 * | 5/2004 | Gabehart et al. | ................ | 710/2 |
| 2005/0033996 A1 * | 2/2005 | Fong et al. | ................ | 713/300 |
| 2005/0050234 A1 * | 3/2005 | Choi | ................ | 710/2 |
| 2005/0102541 A1 * | 5/2005 | Choi | ................ | 713/300 |
| 2006/0045112 A1 * | 3/2006 | Laiho | ................ | 370/419 |
| 2006/0076977 A1 * | 4/2006 | Zhu | ................ | 326/86 |

OTHER PUBLICATIONS

TPS2044 VBUS Power Switch Application Note, J. Roeder, Nov. 13, 2003, TransDimension Inc.*

(Continued)

*Primary Examiner*—Mark H. Rinehart
*Assistant Examiner*—Christopher Daley

(57) ABSTRACT

The dynamic VBUS power source provides a system and method for dynamically powering USB devices. Briefly described, one embodiment is a method comprising determining when the USB device is a master device or a slave device, powering the USB device over a USB connector using a power unit when the USB device is the slave device, and powering a second USB device over the USB connector using the USB device when the USB device is the master device.

11 Claims, 3 Drawing Sheets

OTHER PUBLICATIONS

USB On-The_Go power plus Support, Maxim Integrated, Jun. 10, 2003.*

Miyamura Toshihiko,Electronic Equipemnt and Interface Circuit,Nov. 13, 1998.*

Universal Serial Bus Specification, Apr. 27, 2000,revision 2.0, Tech support, USB.org, pp. i-ii, 171-182.*

* cited by examiner

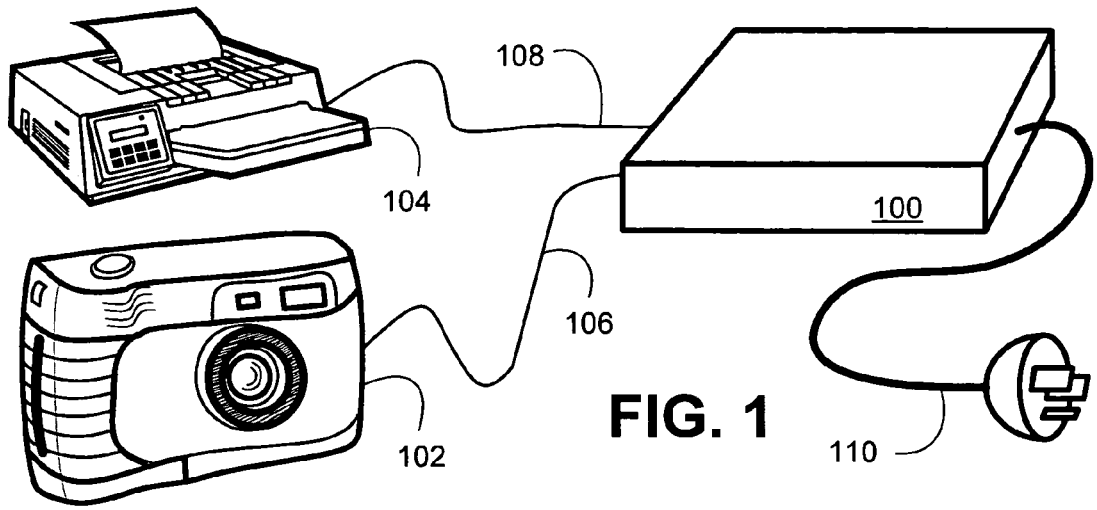
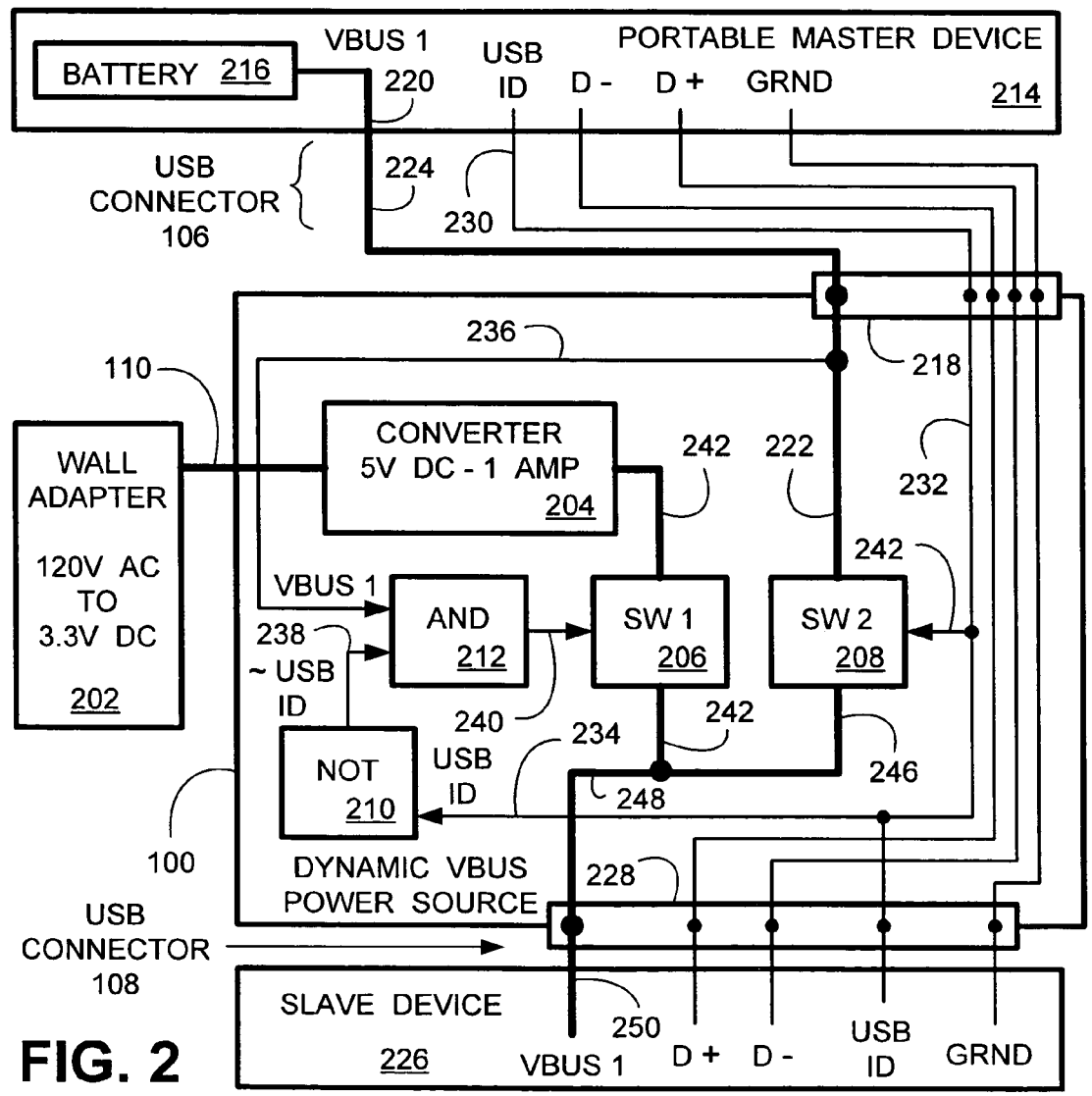

SYSTEM AND METHOD FOR DYNAMIC USB POWER SOURCE

TECHNICAL FIELD

Embodiments are generally related to universal serial bus (USB) devices and, more particularly, are related to a system and method for dynamically powering USB devices.

BACKGROUND

Universal serial bus (USB) devices are configured to couple to other USB compatible devices using a standardized USB connector. Included in the USB connector is a power source connection, typically denoted as VBUS 1, $V_{BUS}$ or the like, which transfers power between coupled USB devices.

A USB "master" device, when acting as a "host" device, provides power over the VBUS 1 connection to a USB "slave" device. The USB master/host device may provide some or all of the USB slave device power needs from an internal battery in the USB master device, or from an ac adapter source or other alternative power source accessible to the USB master device, depending upon the type of USB device. (Some USB slave devices are not configured to receive power from a USB master/host device because of their large power supply requirements which exceed USB maximum power specifications.) USB standards provide that a USB master/host device provide a +5 volt ("V"), 100 milli-amp (mA) power supply, or a +5V, 500 mA power supply, from the USB master device, depending upon the device configurations and the power needs of the USB slave device and the power supply capability of the USB master/host device.

For example, a USB compatible laser printer requires an external power source and is not configured to draw power from a USB master/host device. Other types of printers may have sufficiently low power requirements such that they may be configured to draw power from a USB master/host device.

Some USB master/host devices may only have a limited power supply such that they are able to host (provide power to) USB slave devices requiring no more than a +5 volt ("V"), 100 milli-amp (mA) power supply. Such a USB master/host device is not configured to host USB slave devices requiring more than a +5 volt ("V"), 100 milli-amp (mA) power supply.

USB devices may be configured to operate as either a USB master, USB master/host and/or a USB slave, depending upon the current operating function of the USB device. When acting as a USB master/host, the USB device provides power to the USB slave device to which it is coupled. When acting as a USB slave, the USB device may receive power from the USB master device to which it is coupled (if the USB device is configured to take power from a host when operating as a slave device).

In situations where a portable USB device is acting as a USB master/host and supplying power to a USB slave from its internal battery, the USB device's power supply (capacity) may be limited. That is, if the USB device and the USB slave device together consume the limited power of the internal battery, both devices will fail when power is used up in the battery. Furthermore, the amount of operating time provided by the internal battery is reduced since the battery simultaneously powers both its USB device (operating in a master/host mode) and the connected USB slave device.

Docking stations may be configured to receive USB compatible devices to facilitate communications between USB devices coupled together via the docking station. In some situations, a USB compatible docking station may itself be coupled to a power source (battery, ac adapter, or other source) such that USB slave devices coupled to the USB docking station receive power from the USB docking station.

However, such docking stations are not configured to power USB devices that may operate as either a USB master or a USB slave since the docking station does not include a processing means to determine the operating mode of the USB device.

SUMMARY

The dynamic VBUS power source provides a system and method for dynamically powering USB devices. Briefly described, one embodiment is a method comprising determining when the USB device is a master device or a slave device, powering the USB device over a USB connector using a power unit when the USB device is the slave device, and powering a second USB device over the USB connector using the USB device when the USB device is the master device.

Another embodiment comprises a power unit; a first switch coupled between the power unit and a first USB device; a second switch coupled between a second USB device and the first USB device; and a switch control unit configured to close the first switch and open the second switch when the first USB device is a slave device configured to receive power via a USB connection, such that the first USB device is powered by the power unit.

BRIEF DESCRIPTION OF THE DRAWINGS

The components in the drawings are not necessarily to scale relative to each other. Like reference numerals designate corresponding parts throughout the several views.

FIG. 1 is illustrative system of an image capture device, printer and dynamic VBUS power source coupled together via universal serial bus (USB) connectors.

FIG. 2 is a block diagram illustrating an embodiment of a dynamic VBUS power source.

DETAILED DESCRIPTION

Figure 4:
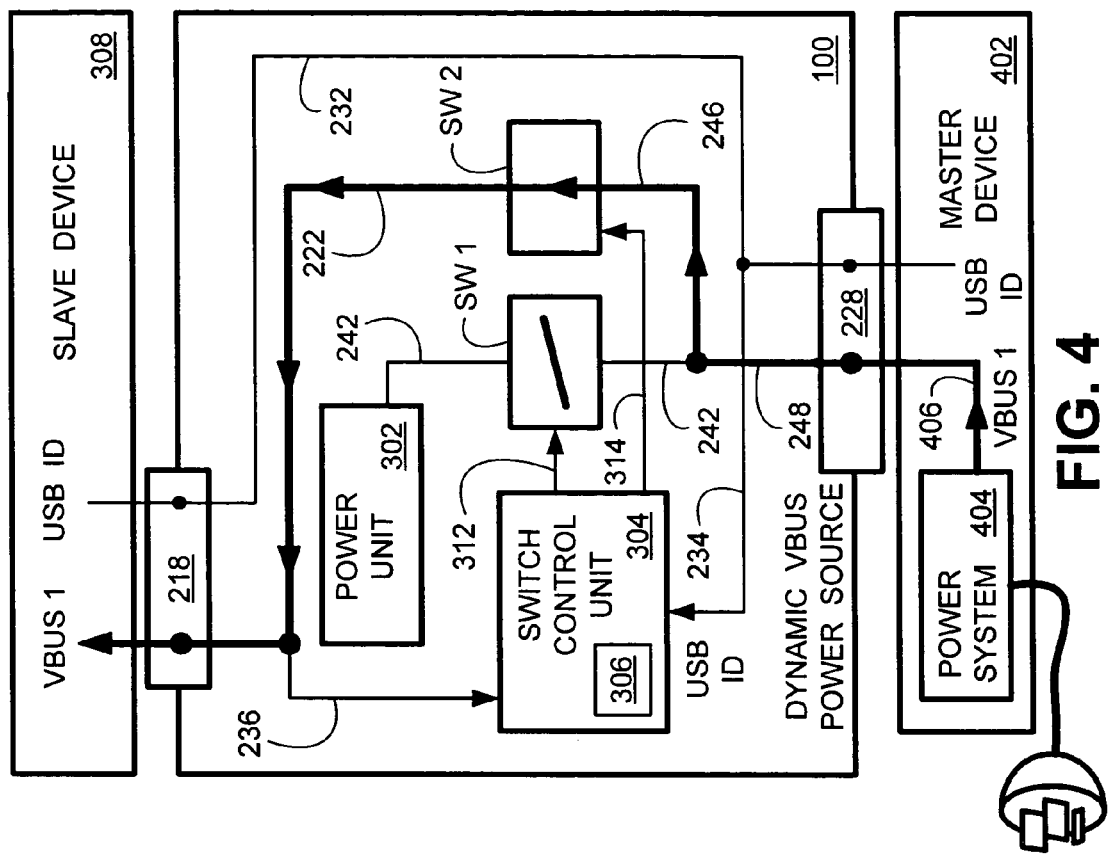
FIG. 4 is a block diagram illustrating the flow of power from an embodiment of the dynamic VBUS power source to a slave device when a powered host master device is coupled to the dynamic VBUS power source.

FIG. 1 is an illustrative system of an image capture device 102, printer 104 and dynamic VBUS power source 100 coupled together via universal serial bus (USB) connectors 106 and 108. The dynamic VBUS power source 100 includes an outlet connector 110 such that the dynamic VBUS power source 100 is able to draw power from an outlet coupled to an electric power distribution system.

The image capture device 102 is noted as a portable device. Accordingly, power for the image capture device 102 is provided by an internal battery (not shown). In this illustrative example, the image capture device is a master device.

The printer 104 is also illustrated as a portable device in this illustrative example. Here, the printer is a slave device which draws some or all of its power over the USB connector 108.

Had the image capture device 102 (master/host) been coupled directly to the printer 104 (slave) via a USB connector, the printer 104 would have drawn its power from the image capture device 102 via the coupling USB connector. Accordingly, the internal battery of the image capture device 102 would have been used to power the printer 104. Since in this illustrative example the image capture device 102 is not coupled to an external power supply, the operating time of the printer would be limited by the battery life of the image capture device 102.

However, when the image capture device 102, printer 104 and dynamic VBUS power source 100 coupled together via universal serial bus (USB) connectors 106 and 108, the dynamic VBUS power source 100 determines that the image capture device 102 is a master type device. Accordingly, the dynamic VBUS power source 100 provides power to the printer 104 via USB connector 108.

The image capture device 102 of FIG. 1 is used as an exemplary master/host device that is configured to provide power over a USB connector. Any suitable USB compatible master/host device could have been used in this simplified illustrative example. Similarly, the printer 104 is used as an exemplary slave device that is configured to receive all of or part of its power over a USB connector. Any suitable USB compatible slave device could have been used in this simplified illustrative example.

FIG. 2 is a block diagram illustrating an embodiment of a dynamic VBUS power source 100. The exemplary embodiment of the dynamic VBUS power source 100 comprises a wall adapter 202, a converter 204, a first switch (SW1) 206, and second switch (SW2) 208, a "NOT" logical device 210 and an "AND" logic device 212.

In various embodiments, the first switch (SW1) 206 and second switch (SW2) 208 may be implemented as hardware switch devices or implemented as firmware controlled switches. Any suitable switching device or means may be used. A nonlimiting example of a hardware switch is a transistor.

The dynamic VBUS power source 100 is coupled to a master device 214 configured to operate as a host to a slave device. Here, master device 214 is illustrated as being portable and as having an internal battery 216. The USB connector 106 couples the dynamic VBUS power source 100 and the portable master device 214. USB connector 106 couples to the dynamic VBUS power source 100 via port 218 using a suitable USB connector (not shown). Various USB connector formats may be employed by various embodiments to provide coupling of the USB connector 106 to the dynamic VBUS power source 100. A USB compatible port (not shown) resides on the portable master device 214 to couple the portable master device 214 and the USB connector 106.

USB connector 106 provides connectivity for the VBUS 1, USB ID (identifier), D+ (data), D− (data) and GRND (ground) connections used in the exemplary USB system. The dynamic VBUS power source 100 is coupled to slave device 226 via USB connector 108. USB connector 108 couples to the dynamic VBUS power source 100 via port 228 using a suitable USB connector (not shown). Various USB connector formats may be employed by various embodiments to provide coupling of the USB connector 108 to the dynamic VBUS power source 100. A USB compatible port (not shown) residing on the slave device 226 is used to couple the slave device 226 and the USB connector 108. USB connector 108 provides connectivity for the VBUS1, USB ID (identification), D+ (data), D− (data) and GRND (ground) connections used in the USB system.

In some embodiments, the USB connector 106 and/or 108 may not be used. Rather, the portable master device 214 and/or the slave device 226 may be directly coupled to the dynamic VBUS power source 100 using a suitable connector, such as employed in docking stations or the like. Furthermore, the ports used by the portable master device 214, slave device 226 or dynamic VBUS power source 100 need not be the same type of USB port. Ports may be selected as a design choice.

In the various embodiments, the USB ID signal from the portable master device 214 is used by the dynamic VBUS power source 100 to determine that the portable master device 214 is actually coupled to port 218. This USB ID signal is communicated, via connections 230, 232 and 234, to the "NOT" logical gate 210. If the USB ID signal on connections 230, 232 and 234 is a logical low, it is understood that the device coupled to the dynamic VBUS power source 100 at port 218 is a master type device. After inversion of the USB ID signal, the inverted signal (~USB ID) is communicated, via connector 236, to the "AND" logical gate 212.

If the portable master device 214 is configured to operate as a host, a corresponding signal is detectable on the VBUS1 connections 220, 224, 222. This signal is communicated, via connector 236, to the "AND" logical gate 212.

In the event that the VBUS1 signal on connector 236 is a logical high (indicating that the portable master device 214 is configured for host operation) and the ~USB ID signal on connector 238 is a logical high (indicating that the device coupled to the dynamic VBUS power source 100 is a master type device), the output of the "AND" logical gate 212 is a logical high. The ~USB ID ("not" USB ID) signal on connector 238 is the logical inverse of the USB ID signal on connector 234. Switch SW1 is coupled to the "AND" logical gate 212 via connector 240. When the "AND" logical gate 212 output is a logical high, switch SW1 206 closes.

Accordingly, the converter 204 is coupled to the VBUS1 via connector 242. Additionally, the USB ID signal is coupled to switch SW2 208, via connector 242. In the event that the USB ID signal on connector 242 is a logical high (indicating that the device coupled to the dynamic VBUS power source 100 is a master type device), switch SW2 208 opens. Accordingly, the VBUS1 connector 222 is decoupled from the VBUS1 connector 246. Thus, power cannot be drawn from the battery 216 over the VBUS 1 connections 220, 224, 222 because switch SW2 208 is open.

Because SW1 206 is closed and switch SW2 208 is open, power is drawn by the slave device 226 from converter 204, via connections 242, 248 and 250.

Accordingly, this exemplary embodiment of the dynamic VBUS power source 100 has detected the presence of the portable master device 214, has isolated the VBUS connections to the portable master device 214 so that power is not drawn therefrom, and provides power to the slave device 226 from converter 204.

When another type of device is coupled to the dynamic VBUS power source 100, via port 218, the USB ID signal on connector 232 may be a logical high. For example, the device may be a slave device that draws all of, or a portion of, its power from the VBUS1 connection. Accordingly, the logical high signal on connector 232 closes the switch SW2 208. The ~USB ID signal on connector 238 is a logical low (indicating that the device coupled to the dynamic VBUS power source 100 is, for example, a slave type device). Therefore, the output of the "AND" logical gate 212 is a logical low. (Furthermore, the VBUS1 signal on connector 236 may also be a logical low.) Because the "AND" logical gate 212 output is a logical low, switch SW1 206 opens.

In the above-described situation, assuming that a master type device is coupled to the dynamic VBUS power source 100 at port 228, the slave type device coupled to port 218 draws power from the master type device via the VBUS 1 path (connections 250, 248, 246, 222, and 224).

As mentioned above, the exemplary embodiment of the dynamic VBUS power source 100 comprised wall adapter 202. If the dynamic VBUS power source 100 is configured for operation on a 120/220 volt, 60 hertz system, the wall adapter 202 converts the 120 volt alternating current (AC) provided from the electric distribution system to, for example, 3.3 volts direct current (DC). This embodiment uses the wall adapter 202 for convenience since it is configured to easily plug into conventional wall outlets. The output of the wall adapter 202 is provided to the converter 204, which in this illustrative embodiment, converts the received power to 5 volts DC, up to a 1 amp maximum rating.

Other embodiments of the dynamic VBUS power source 100 may employ any other suitable power source conversion system or means. For example, wall adapter 202 may be modified to couple to an electric distribution system providing power using a different voltage and/or frequency. Also, the wall adapter 202 may be configured to provide a different output DC voltage and/or a suitable DC current. In some embodiments, the converter 204 is configured to receive power directly from the electric distribution system, itself converting the received AC distribution system voltage into a suitable USB compatible DC voltage. Also, in other embodiments, the converter 204 may provide a different voltage and/or current.

Figure 3:
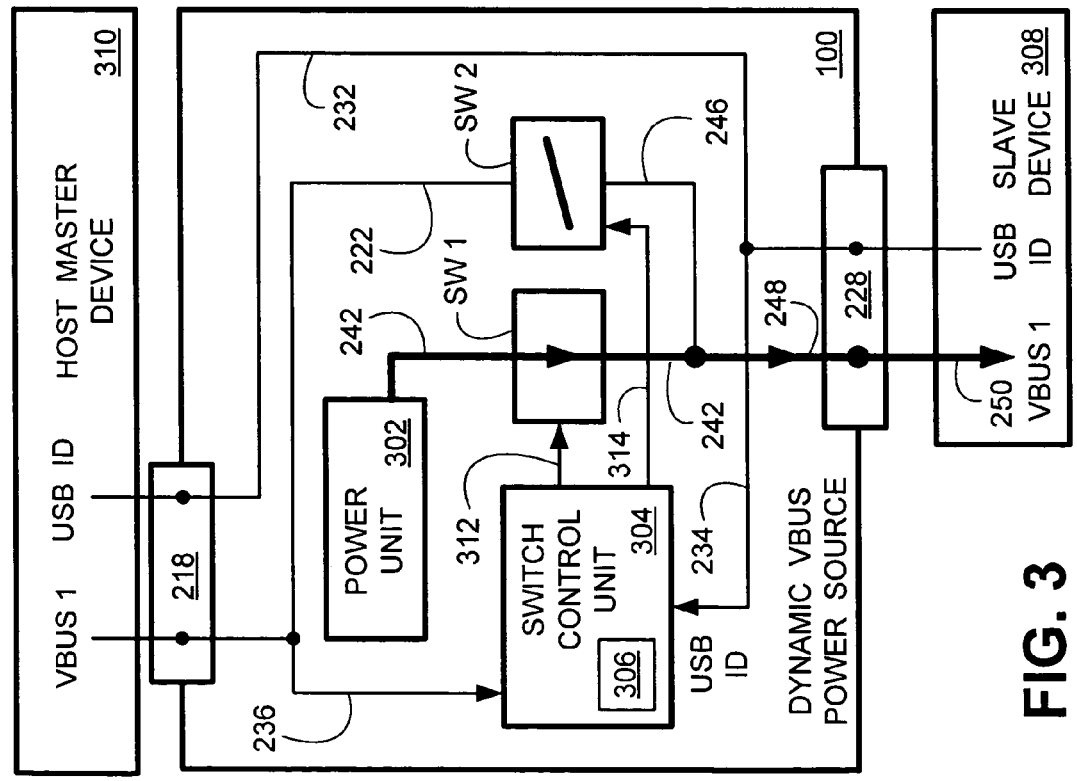
FIG. 3 is a block diagram illustrating the flow of power from an embodiment of the dynamic VBUS power source to a slave device when a portable master device is coupled to the dynamic VBUS power source.

To further illustrate the principles of embodiments of the dynamic VBUS power source 100, two illustrative examples are described hereinbelow. FIG. 3 is a block diagram illustrating the flow of power from an embodiment of the dynamic VBUS power source to a slave device when a portable master device is coupled to the dynamic VBUS power source. FIG. 4 is a block diagram illustrating the flow of power from an embodiment of the dynamic VBUS power source to a slave device when an externally powered host master device is coupled to the dynamic VBUS power source.

In FIGS. 3 and 4, the embodiment of the dynamic VBUS power source 100 comprises a power unit 302 and a switch control unit 304. The power unit 302 may be any unit that receives external power and provides suitable power on the VBUS1 connector 242.

The switch control unit 304 is any suitable logical control unit configured to operate switches SW1 and SW2. Switch control unit 304 may be a software based device, a firmware based device, or a combination firmware/software device. In embodiments employing software to control the switches SW1 and SW2, software would be executed by a suitable processor system 306. In some embodiments, switches SW1 and/or SW2 may be components internal to the switch control unit 304.

Switch control unit 304, as described above, detects conditions on the USB ID connector 234 and the VBUS1 connector 236. Based upon the logical conditions on the connectors 234 and 236, the opening/closing of the switches SW1 and SW2 is controlled by the switch control unit 304.

In FIG. 3, a slave device 308 is coupled to port 228 and a host master device 310 is coupled to port 218. Here, the host master device 310 is a USB master type device where it is not desirable to supply power to the slave device 308. For example, the host master device 310 may be portable and employ a battery (like the above-described portable master device 214 of FIG. 2). In other situations, the host master device may not be configured to provide the power requirements of the slave device 308 over its VBUS1 connector 250.

Accordingly, the switch control unit 304 detects the above described situation based upon the logical signal conditions on the VBUS1 connector 236 and the USB ID connector 234. Here, in the exemplary embodiment of FIG. 3, the switch control unit 304 sends a signal to switch SW1, via connector 312, to close the switch. Also, the switch control unit 304 sends a signal to switch SW2, via connector 314, to open the switch SW2, thereby isolating the host master device 310 from the power unit 302. The path of the power, provided to the slave device 308 from the power control unit 302, is illustrated over the connections 242, 248 and 250.

As illustrated in FIG. 4, slave device 308 is now coupled to port 218 and a host master device 402 is coupled to port 228. Here, the host master device 402 is a USB master type device configured to supply power to the slave device 308. For example, one type of host master device may include a power system 404 that is configured to supply power onto its VBUS 1 connector 406.

Accordingly, the switch control unit 304 detects the above described situation based upon the logical signal conditions on the VBUS1 connector 236 and the USB ID connector 234. Here, in the exemplary embodiment of FIG. 4, the switch control unit 304 sends a signal to switch SW1, via connector 312, to open the switch SW1, thereby isolating the USB VBUS1 connectors (and accordingly, isolating the host master device 402 and slave device 308) from the power unit 302. Also, the switch control unit 304 sends a signal to switch SW2, via connector 314, to close the switch. The path of the power, provided to the slave device 308 from the host master device 402, is illustrated over the connections 406, 248, 246 and 222.

Returning to FIG. 2, if the above-described slave device 308 is coupled to port 218 and the above-described host master device 402 is coupled to port 228, the dynamic VBUS power source 100 would detect the conditions as described above and SW1 would be opened and SW2 would be closed such that power is provided to the slave device 308 from the host master device 402.

Figure 5:
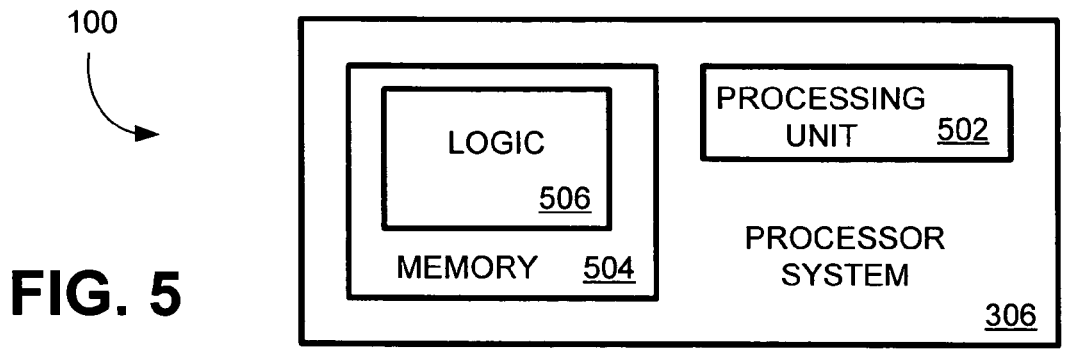
FIG. 5 is a block diagram illustrating a processor system used by embodiment of a dynamic VBUS power source.

FIG. 5 is a block diagram illustrating a processor system 306 used by embodiment of a dynamic VBUS power source 100. The processor system 306 comprises a processing unit 502, memory 504 and logic 506. Logic 506, in the form of a program residing on a computer-readable medium in one embodiment, is retrieved from memory 504 and executed by processor system 306 to control power to the various USB devices as described hereinabove.

Figure 6:
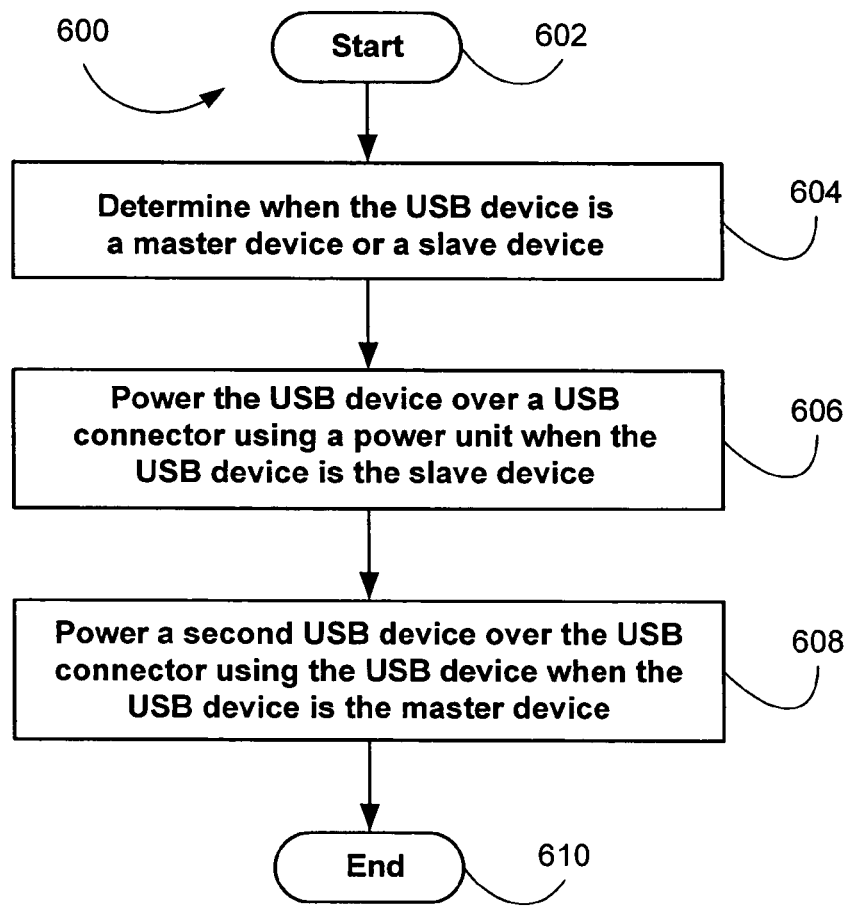
FIG. 6 is a flowchart illustrating an embodiment of a process for dynamically powering USB devices.

FIG. 6 is a flowchart 600 illustrating an embodiment of a process for dynamically powering USB devices. The flow chart 600 of FIG. 6 shows the architecture, functionality, and operation of an embodiment for implementing the logic 506 (FIG. 5). An alternative embodiment implements the logic of flow chart 600 with hardware configured as a state machine. In this regard, each block may represent a module, segment or portion of code, which comprises one or more executable instructions for implementing the specified logical function(s). It should also be noted that in alternative embodiments, the functions noted in the blocks may occur out of the order noted in FIG. 6, or may include additional functions. For example, two blocks shown in succession in FIG. 6 may in fact be substantially executed concurrently, the blocks may sometimes be executed in the reverse order, or some of the blocks may not be executed in all instances, depending upon the functionality involved, as will be further clarified hereinbelow.

The process begins at block 602. At block 604, a determination is made when the USB device is a master device or a slave device. At block 606, the USB device is powered over a USB connector using a power unit when the USB device is the slave device. At block 608, a second USB device is powered over the USB connector using the USB device when the USB device is the master device. The process ends at block 610.

Embodiments of the logic 506 implemented in memory 504 (FIG. 5) may be implemented using any suitable computer-readable medium. In the context of this specification, a "computer-readable medium" can be any means that can store, communicate, propagate, or transport the data associated with, used by or in connection with the instruction execution system, apparatus, and/or device. The computer-readable medium can be, for example, but not limited to, an electronic, magnetic, optical, electromagnetic, infrared, or semiconductor system, apparatus, device, or propagation medium now known or later developed.

It should be emphasized that the above-described embodiments are merely examples of the disclosed system and method. Many variations and modifications may be made to the above-described embodiments. All such modifications and variations are intended to be included herein within the scope of this disclosure and protected by the following claims.

What is claimed is:

1. A method for powering a universal serial bus (USB) device, comprising;
    determining when the USB device is a master device or a slave device;
    powering through a first switch the USB device over a USB connector using a power unit when the USB device is a slave device; and
    powering through a second switch located between the USB device and a second USB device over the USB connector using the USB device when the USB device is the master device;
    detecting a logical low on a USB identifier (ID) connector; and
    detecting a logical high on a VBUS connector,
    such that the USB device is powered over the USB ID connector using the power unit;
    inverting the logical low on the USB ID connector to a second logical high; and
    outputting a third logical high when the USB ID is inverted to the second logical high and when the logical high on the VBUS connector is detected; and
    closing the first switch when the third logical high is output such that the USB device is powered from the power unit coupled to the first switch.

2. The method of claim 1, further comprising:
    closing the first switch when the USB device is the slave device such that the USB device is powered from the power unit coupled to the first switch; and
    opening the second switch when the USB device is the slave device such that the second USB device is isolated from the USB device.

3. The method of claim 1, further comprising:
    opening the first switch when the USB device is the master device such that the power unit coupled to the first switch is isolated from the USB connector; and
    closing the second switch when the USB device is the master device such that the second USB device is powered by the USB device.

4. The method of claim 1, further comprising detecting a logical high on a USB identifier (ID) connector such that the second USB device is powered by the USB device.

5. The method of claim 1, further comprising detecting a logical low on a VBUS connector such that the second USB device is powered by the USB device.

6. The method of claim 1, further comprising:
    receiving alternating current (AC) power from an electric distribution system; and
    converting the received AC power into direct current (DC) power suitable for the USB connector.

7. A system for powering a universal serial bus (USB) device, comprising:
    means for determining when the USB device is a master device or a slave device;
    means for receiving alternating current (AC) power from an electric distribution system and converting the received AC power into direct current (DC) power suitable for a USB connector;
    means for powering the USB device over the USB connector using the means for receiving and converting power when the USB device is the slave device; and
    means for powering a second USB device over the USB connector using the USB device when the USB device is the master device;
    means for detecting a logical low on a USB identifier (ID) connector; and
    means for detecting a logical high on a VBUS connector such that the USB device is powered over the USB connector using the means for receiving and converting power;
    means for inverting the logical low on the USB ID connector to a second logical high;
    means for outputting a third logical high when the USB ID is inverted to the second logical high and when the logical high on the VBUS connector is detected; and
    means for closing a first switch when the third logical high is output such that the USB device is powered from the means for receiving and converting power coupled to the first switch.

8. The system of claim 7, further comprising;
    means for closing a first switch when the USB device is the slave device such that the USB device is powered using the means for receiving and converting power, the means for receiving and converting power coupled to the first switch; and
    means for opening a second switch when the USB device is the slave device such that the second USB device is isolated from a power unit.

9. The system of claim 7, further comprising:
    means for opening a first switch when the USB device is the master device such that the means for receiving and converting power coupled to the first switch is isolated from the USB connector; and
    means for closing a second switch when the USB device is the master device such that the second USB device is powered by the USB device.

10. The system of claim 7, further comprising means for opening a second switch when the logical low on the USB ID connector is detected such that the second USB device is isolated from the means for receiving and converting power.

11. The method of claim 1, further comprising opening the second switch when the logical low on the USB ID connector is detected such that the second USB device is isolated from the power unit.

* * * * *

UNITED STATES PATENT AND TRADEMARK OFFICE
CERTIFICATE OF CORRECTION

PATENT NO. : 7,310,697 B2  Page 1 of 1
APPLICATION NO. : 10/978607
DATED : December 18, 2007
INVENTOR(S) : Amol Pandit et al.

It is certified that error appears in the above-identified patent and that said Letters Patent is hereby corrected as shown below:

On the face page, in field (75), under "Inventors", in column 1, line 1, delete "Greeley, CO (US)" and insert -- Shanghai, China --, therefor.

On the face page, in field (75), under "Inventors", in column 1, line 2, after "Robert" insert -- H. --.

On the face page, in field (75), under "Inventors", in column 1, line 3, delete "Dan" and insert -- Daniel J --, therefor.

On page 2, in field (56), under "Other Publications", in column 1, line 1, after "Integrated" insert -- Products --.

In column 7, line 25, in Claim 1, delete "comprising;" and insert -- comprising: --, therefor.

In column 8, line 38, in Claim 8, delete "comprising;" and insert --comprising: --, therefor.

Signed and Sealed this

Seventeenth Day of June, 2008

JON W. DUDAS
*Director of the United States Patent and Trademark Office*